United States Patent

Jenson

[15] 3,706,161
[45] Dec. 19, 1972

[54] TREE MEDICATION CAPSULE

[72] Inventor: Clark E. Jenson, Route 2, Blair, Nebr.

[22] Filed: Nov. 16, 1970

[21] Appl. No.: 89,815

[52] U.S. Cl. .............................................. 47/57.5
[51] Int. Cl. ............................................ A01g 7/06
[58] Field of Search .................... 47/11, 50-54, 57.5; 21/73

[56] References Cited

UNITED STATES PATENTS

| | | | |
|---|---|---|---|
| 1,999,458 | 4/1935 | Hollister | 47/57.5 |
| 1,207,444 | 12/1916 | Soule | 47/51 |
| 283,593 | 8/1883 | Fox | 47/53 |
| 1,511,632 | 10/1924 | Penska | 47/53 |
| 2,944,369 | 7/1960 | Soule | 47/52 |
| 3,469,344 | 9/1969 | Garvey | 47/53 |

FOREIGN PATENTS OR APPLICATIONS

| | | | |
|---|---|---|---|
| 786,083 | 11/1957 | Great Britain | 47/57.5 |
| 891,350 | 3/1944 | France | 47/57.5 |

Primary Examiner—Robert E. Bagwill
Attorney—Anthony A. O'Brien

[57] ABSTRACT

A tree medication capsule for insertion into a hole in the trunk of a tree includes a hollow cartridge driven into a predrilled hole in the tree with wound dressing sealing the hole; barbs on the cartridge engage the sides of the hole to prevent the tree from ejecting the capsule while the tree sap dissolves sealant material in slots in the cartridge to free the medication in the capsule for absorption by the tree.

4 Claims, 3 Drawing Figures

PATENTED DEC 19 1972 3,706,161
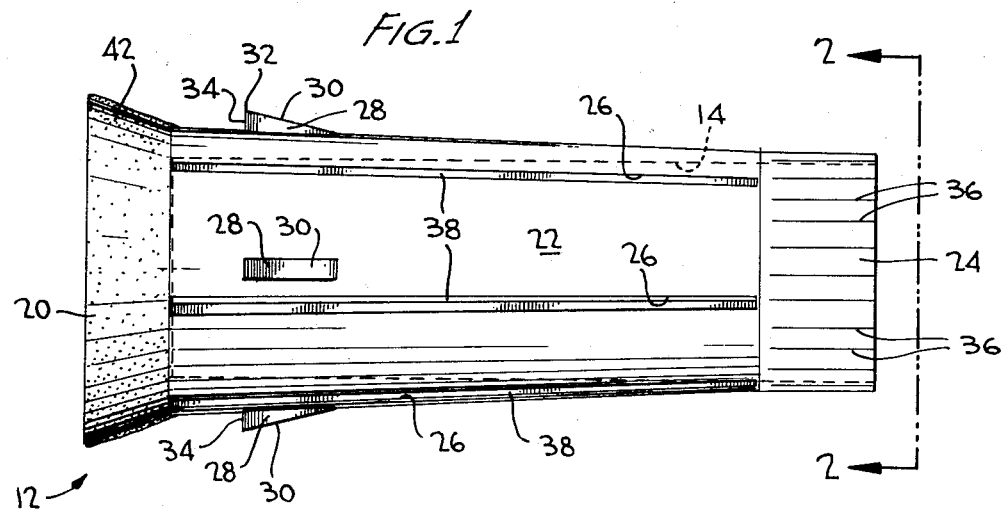
FIG.1
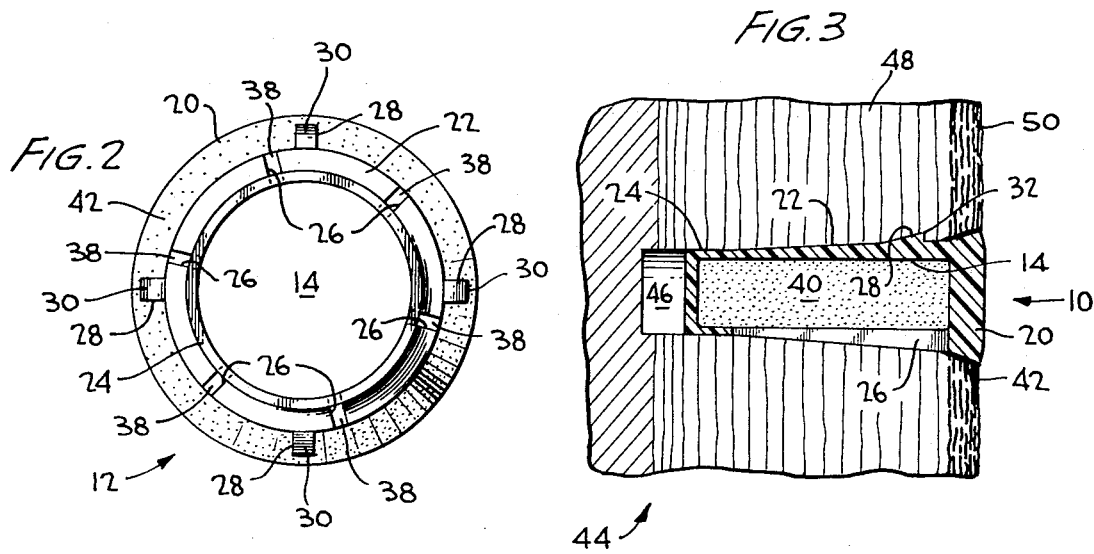
FIG.2
FIG.3
INVENTOR,
CLARK E. JENSON
BY Anthony A. O'Brien
ATTORNEY

TREE MEDICATION CAPSULE

BACKGROUND OF THE INVENTION

This invention relates to devices for feeding medication into plants and more particularly to a medication feeding capsule for insertion into a hole in a tree.

Plants generally and particularly trees are treated for various diseases or deficiencies by the introduction of medication into the plant itself. One method of introducing the medication into a tree is to drive a capsule containing the desired medication into the trunk of the tree enabling the phloem layer of the tree to absorb the medication from the capsule. A problem in designing a medication containing capsule for such a use is that the medication must be retained in the capsule until it is inserted into the tree and yet once the capsule has been inserted, the medication must be freed from the capsule to be absorbed by the tree. U.S. Pat. No. 1,999,458 solves this problem by providing a hollow capsule with openings which are covered by film-like coverings that are disrupted or worn away by friction between the wall of the capsule and the hole in the tree. This method of solving the problem requires that there by an interference fit between the hole in the tree and the capsule and that the film-like coverings have not flowed into the openings but have remained on top of the openings to insure that the openings are opened by the friction. The capsule of this invention solves this problem by the use of elongated slots which are sealed with a sap soluble material to retain the medication within the capsule until the capsule is inserted into the tree whereupon the tree sap itself dissolves the seal material and releases the medication to be absorbed by the tree.

Another problem associated with the use of a medication capsule inserted into the trunk of a tree, is the defense mechanism of the tree which builds up sap pressure at the intrusion of a foreign object, such as a medication capsule, in an attempt to eject the foreign object from the tree. The medication capsule of this invention is provided with anti-rejection barbs which, upon the insertion of the capsule into the tree, engage the tree to prevent the capsule from being "popped out" or ejected by the sap pressure.

Yet another problem associated with the use of medication capsules inserted into trees is the post-treating of the tree after the capsule is in place. Once the capsule is inserted into the trunk of the tree, the resulting hole must be closed and a tree wound dressing must be applied to help the tree heal and prevent insects from attacking the tree at the wound. The capsule of this invention has a head with a ring of tree wound dressing therearound which as the capsule is driven into the tree, closes the hole in the tree and applies the dressing to the hole.

The tree medication capsule of this invention includes a hollow cartridge having an outer head with a ring of tree wound dressing therearound, a barbed hollow shank attached to the head and having longitudinal slots therein which open the hollow cavity therein to the exterior thereof, and an inner end. The longitudinal slots of the shank are sealed by a sap soluble material and the desired medication is inserted through the inner end of the cartridge. Once the medication has been inserted into the hollow cavity of the cartridge, the inner end is crimped closed to retain the medication therein. The capsule is now ready to be inserted into a tree trunk whereupon the head and tree wound dressing seals the hole in the trunk and the barbs prevent the tree from ejecting the capsule while the sap dissolves the material in the slots to free the medication for absorption by the phloem layer of the tree trunk.

Therefore, it is an advantage of this invention that medication contained in a capsule be released through slots in the capsule by the tree sap dissolving the material sealing the slots once the capsule has been inserted into the tree.

The present invention has another object in that the tree can absorb the medication at its own rate from the abundance of medication released through the slots in the capsule.

It is yet another advantage of this invention that a medication capsule is provided with integrally formed barbs to prevent the capsule from being ejected by the natural build up in sap pressure within the tree.

It is a further advantage of this invention that a medication capsule has a head on its outer end to close the hole in the tree trunk once the capsule is inserted.

It is yet a further advantage of this invention that the head on the outer end of a medication capsule has a ring of tree wound dressing to seal the hole in the tree trunk once the capsule is inserted.

These and other advantages of the present invention will become apparent from the following detailed description and the accompanying drawing.

BRIEF DESCRIPTION OF THE DRAWING

FIG. 1 is a side elevation of the cartridge used to make the capsule of this invention;

FIG. 2 is an end view taken along the line 2—2 of FIG. 1; and

FIG. 3 is a cut-away view of a portion of a tree trunk showing the capsule of this invention inserted therein.

DESCRIPTION OF THE PREFERRED EMBODIMENT

As is illustrated in FIG. 3, the present invention is embodied in a tree medication capsule, indicated generally at 10 and is made from a hollow cartridge 12 of molded plastic or other suitable material. The cartridge 12 is generally cylindrical in shape with a hollow cylindrical cavity 14 therein which is open to the inner end thereof for a purpose which will appear later. The cartridge 12 could be of any size but a practical size for most trees would be in the range of a three-eighths inch diameter with a 1 to 2 inch length. The essentially cylindrical exterior of the cartridge 12 has three distinct sections a head 20, a shank 22 and an end 24.

The head 20 on the outer end of the cartridge 12 is solid throughout and is exteriorly shaped like the frustrum of a cone with the large diameter of the frustrum on the extreme end and the small diameter on the right FIG. 1, merging with the shank 22. The head 20 has its outer end colored to match the bark of the tree in which the capsule 10 will be later inserted so that the head 20 will blend into the surrounding bark on the tree and not be an eyesore.

The shank 22 is attached at the head 20 and exteriorly appears more cylindrical than does the head 20. However, the shank 22 is also shaped like a frustrum of a cone for it has a slight taper with the larger diameter being on the left FIG. 1, at the head 20, and the smaller diameter being on the right. The shank 22 is tapered to obtain a tight fit between it and the tree to prevent air from getting to the medication in the capsule 10 once the medication is released therefrom. The interior of the shank 22 is hollow as most of the cylindrical cavity 14 is located therein. The left end of the cylindrical cavity 14 (as viewed in FIG. 1 is closed by the right end of the head 20.

The shank 22 also has a series of dispensing apertures 26 extending from the exterior surface thereof to the cavity 14. These apertures 26 are in the form of elongated slots of which there are a series of six, circumferentially equally spaced about the exterior of the shank 22. The slots 26 run from the head 20 almost to the end 24 to provide ample egress from the cavity 14 to the exterior of shank 22.

The shank 22 also has a series of four equally circumferentially spaced anti-rejection barbs 28 which are so located on the exterior of the shank 22 that they avoid the slots 26. The anti-rejection barbs 28 themselves are rectangular in plan view with the long side being parallel to the axis of the shank 22 and are raised from the exterior of the shank 22. Each barb 28 has a sloping lead-in surface 30 which rises from the surface of the shank 22 on the right FIG. 1 to a point 32 where it meets a retaining shoulder 34 rising radially from the shank 22 surface. The retaining shoulder 34 is spaced a slight distance from the head 20 and faces to the left FIG. 1 or outwardly so that when the capsule 10 is inserted into the tree trunk, the barbs 28 will catch on the tree itself as shown in FIG. 3 and not just in the bark of the tree as shown in FIG. 3.

The end 24 is attached to the right end FIG. 1 of the shank 22 and is initially cylindrical in shape. The end 24 is also hollow in the center containing the balance of cavity 14 to provide an opening thereto. The end 24 has a series of grooves 36 which enable it to be crimped closed to close the right end of cavity 14.

The cartridge 12 in preparation to receive the medication 40 for the tree, has the slots 26 plugged with a material 38 which is soluble in tree sap. This material 38 could be any material which will close the slots 26 to air and which is soluble in tree sap such as one of the non-liquid polyalkylene types of polyalkylene glycol. Once the slots 26 are plugged, the only access to the cylindrical cavity 14 is through the end 24.

The cartridge 12 is next positioned with end 24 raised and a measured amount of medication 40 is poured into cavity 14. The medication 40 used would depend upon the intended use of the capsule 10. For example, if the capsule 10 was to be used in a pin oak tree to treat a yellowing problem because of chlorosis which is due to a deficiency of iron in the soil, the medication 40 would be a mixture of compounds such as are disclosed in U.S. Pat. No. 2,534,787. The amount of medication 40 would of course depend upon the size of the capsule 10 but with a 1 inch capsule about three-eighths inch in diameter, a third of a teaspoon could be inserted into the cavity 14 while two thirds of a teaspoon could be inserted into a similar capsule 10, 2 inches long.

Once the proper amount of medication 40 has been inserted into cavity 14, the end 24 is mechanically crimped closed and sealed by any suitable sealant to provide the cavity 14 with an air tight seal. The end 24 now has an aperture similar to the end of a shotgun shell. The capsule 10 is completed by applying a ring of suitable tree wound dressing 42 such as a grafting wax which aids the tree to heal and to repel insects.

The use of the capsule 10 to treat a tree 44 is shown in FIG. 3. A hole 46 of the proper diameter is made in the tree 44 by using any suitable means such as a drill or awl. The hole 46 must be of sufficient depth to pass through the phloem area 48 which contains the circulatory system of the tree and of sufficient depth to allow insertion of the entire capsule 10 therein so that the head 20 will be flush with the bark 50. Once the hole 46 is made, the capsule 10 is manually started down the hole 46 with the end 24 being inserted into the hole 46 first. Then the capsule 10 is driven into the hole 46 by lightly tapping on the head 20 with a mallet or other suitable means until the head 20 is flush with the bark 50 as is shown in FIG. 3.

As the capsule 10 is driven into the hole 46, the taper of shank 22 insures a tight fit between the exterior surface of the capsule 22 and the tree 44 itself. This tight fit insures that the sap from the tree 44 will contact the sap soluble material 38 in the slots 26 and also prevents the air from reaching the medication 40 once it is freed. Also as the capsule 10 is driven into the hole 46, the anti-rejection barbs 28 locally compress fibers of the tree 44 by sliding them up lead-in surface 30 only to have them rebound once point 32 is reached, to provide material on which the point 32 and the retaining shoulder 34 can anchor enabling the anti-rejection barbs 28 to prevent "popout" or ejection of the capsule 10 by the tree 44.

When the capsule 10 is driven into the tree 44, the head 20 will be flattened slightly and this together with the frustrum shape head 20 will plug the hole 46. When the hole 46 is plugged, the tree wound dressing 42 speeds the healing of the tree 44 while repelling insects from the hole 46 and the tree wound requires no other post-insertion treatment.

Once the capsule 10 has been inserted into the tree 44, the natural defense mechanism of the tree produces sap which builds up pressure attempting to expel the capsule 10. In the process, the sap contacts the sap soluble material 38 and dissolves it, releasing the medication 40. The released medication 40 contacts a wide area of the phloem layer 48 of the tree 44 because of the slots 26 enabling the medication 40 to be absorbed by the tree 44 at its own rate until all medication 40 is absorbed.

Thus the capsule of this invention provides a simple and yet effective way to supply medication to a diseased or deficient tree. In fact the capsule method of treatment is so simple that the homeowner himself could do it. All he needs is a drill bit or awl of the proper size, a sufficient number of capsules for the size of tree he has and an instruction booklet, all of which could be supplied in one package, to treat the tree himself.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A tree medication capsule for insertion into a hole of a tree comprising
   a shank portion having an external surface and an internal cavity,
   anti-rejection barb means on said external surface adapted to engage the tree and retain the capsule in the tree hole,
   aperture means in said shank portion extending between said internal cavity and said external surface,
   a medication disposed in said internal cavity,
   sap soluble sealing means sealing said aperture means and retaining said medication in said external cavity and being adapted to release said medication into the tree when dissolved by sap of the tree,
   a head element on said shank portion having a frustroconical surface, and
   tree wound dressing means on said frustro-conical surface for closing the tree hole.

2. The invention as recited in claim 1 wherein said aperture means includes a plurality of spaced slots, with each slot having a length coinciding with the length of said shank portion.

3. The invention as recited in claim 2 wherein said anti-rejection barb means includes a plurality of spaced barbs with each barb being located between a pair of said spaced slots.

4. The invention as recited in claim 3 wherein said shank portion and said barbs are integrally constructed of a plastic material.

* * * * *

UNITED STATES PATENT OFFICE
CERTIFICATE OF CORRECTION

Patent No. 3,706,161      Dated December 19, 1972

Inventor(s)    Clark E. Jenson

It is certified that error appears in the above-identified patent and that said Letters Patent are hereby corrected as shown below:

In column 1 line 25, change the first word "by" to --be--.

In column 5 line 13, change the last term "exter" to --inter--.

Signed and sealed this 12th day of June 1973.

(SEAL)
Attest:

EDWARD M. FLETCHER, JR.        ROBERT GOTTSCHALK
Attesting Officer            Commissioner of Patents